United States Patent [19]
Zarouri et al.

[11] Patent Number: 6,034,851
[45] Date of Patent: Mar. 7, 2000

[54] SHORTING BAR AND TEST CLIP FOR PROTECTING MAGNETIC HEADS FROM DAMAGE CAUSED BY ELECTROSTATIC DISCHARGE DURING MANUFACTURE

[75] Inventors: Mourad D. Zarouri, San Diego; Joselito S. Jose, Fremont; Robert W. Miller, San Jose, all of Calif.

[73] Assignee: Read-Rite Corporation, Milpitas, Calif.

[21] Appl. No.: 09/055,729

[22] Filed: Apr. 7, 1998

[51] Int. Cl.[7] .............................. G11B 5/40; G11B 5/455
[52] U.S. Cl. ..................... 360/137; 360/104; 360/128
[58] Field of Search .................................. 360/104, 128, 360/137

[56] References Cited

U.S. PATENT DOCUMENTS 5,644,454  7/1997  Arya et al. .............................. 360/106
5,870,258  2/1999  Khan et al. .............................. 360/104

Primary Examiner—Robert S. Tupper
Attorney, Agent, or Firm—Nathan N. Kallman

[57] ABSTRACT

A method and apparatus for selectively disabling a magnetic head to protect the head from damage caused by electrostatic discharge (ESD) during manufacture. The magnetic head is electrically attached to a flexure. The flexure has a set of test pads and a hinged portion that includes a shorting bar. The hinged portion of the flexure is folded to cause the shorting bar to short the test pads. The folded portion is secured with a clip which may be removed and replaced. A novel test clip is used with the flexure. The folded flexure is inserted into jaws of the test clip. The jaws clamp the folded flexure. The shorting bar shorts the sensor when the test clip is in a first position and removes the short when the test clip is moved to a second position.

17 Claims, 3 Drawing Sheets

SHORTING BAR AND TEST CLIP FOR PROTECTING MAGNETIC HEADS FROM DAMAGE CAUSED BY ELECTROSTATIC DISCHARGE DURING MANUFACTURE

CROSS-REFERENCE TO RELATED APPLICATION

The invention is related to copending application Ser. No. 08/600,240 entitled "Conductive Trace Flexure For A Magnetic Head Suspension Assembly" filed Feb. 12, 1996 and assigned to Read-Rite Corporation, the assignee of the present invention, which copending application is incorporated herein by reference.

BACKGROUND OF THE INVENTION

1. Field of the Invention

The invention relates to thin film magnetic transducers and in particular to a method and means of protecting magnetoresistive (MR) heads from damage caused by electrostatic discharge (ESD) during manufacture.

2. Description of the Related Art

Presently known thin film magnetic heads include an inductive write element for recording signals and a magnetoresistive (MR) sensor for reading the recorded signals. Write operations are carried out inductively using a pair of magnetic write poles which form a magnetic path and define a transducing nonmagnetic gap in the pole tip region. The transducing gap is positioned close to the surface of an adjacent magnetic recording medium such as a rotating magnetic disk. An electrical coil formed between the poles causes flux flow in the magnetic path of the poles in response to a current in the coil that is representative of information to be recorded.

Read operations are carried out by a magnetoresistive (MR) sensor which is spaced from a pair of magnetic shields. The MR sensor changes resistance in response to changes in magnetic flux on the adjacent magnetic recording medium. A sensing electric current passed through the MR sensor responds to the resistance of the MR sensor, which changes in proportion to changes in the magnetic flux. Conventionally, the MR sensor is electrically isolated from the pair of magnetic shields, and a separate set of conductors are provided on one surface of the MR sensor to pass a reference current through the MR sensor.

Compared to conventional thin film recording heads, MR heads are up to 100 times more susceptible to damage during manufacture caused by electrostatic discharge (ESD). During manufacture, the disk drive elements are open to the environment and subject to possible static discharge from human handling. In contrast, during operation of the disk drive in a computer, the elements are encased in a protective cover with appropriate protections against ESD.

One prior approach to protection from ESD damage is described in U.S. Pat. No. 5,644,454 "Electrostatic discharge protection system for MR heads" of Satya P. Arya, et al. which was granted to IBM on Jul. 1, 1997. This patent describes an MR head which receives ESD protection from a mechanism that automatically shorts the MR head whenever a suspension assembly on which the head is mounted is not installed in a head disk assembly (HDA). The suspension assembly includes a flexure underlying a load beam, which is connected to an actuator arm. The MR head is mounted to a distal end of the flexure. Leads from components of the MR head are brought out in the form of MR wired leads running along the load beam and the support arm to a nearby terminal connecting side tab. The conductors are separated and exposed at a designated point along the flexure to provide a contact region. A shorting bar, which comprises an electrically conductive member attached to the actuator arm, automatically shorts the MR wired leads at the contact region when absence of support for the MR head permits the load beam to bend sufficiently toward the shorting bar. Thus, when the assembly is removed from installation in an HDA, the flexure is permitted to move toward the shorting bar, bringing the contact region and the shorting bar in electrical contact to short the MR wired leads and thereby disable the MR sensor. When the assembly is installed in an HDA, the MR head is supported by an air bearing or the disk itself, depending upon whether the disk is rotating or stopped, respectively. In either case, the load beam is not permitted to sag while the shorting bar contacts the conductors, thus deactivating the MR sensor. Temporary ESD protection mechanisms are also provided, these being removable prior to operation of the HDA by breaking and removing various temporary shorting mechanisms.

The disadvantage of this approach is that the structure is complex to manufacture and adds height to the head stack assembly. The temporary ESD protection mechanisms are removed prior to operation of the HDA by breaking and removing various temporary shorting mechanisms, and do not provide a means for replacing the shorting mechanism after testing during manufacture, Therefore the shorting mechanisms are not reusable.

It is an object of this invention to provide an ESD protection mechanism that can be temporarily removed for testing during manufacture and is reusable.

It is an object of this invention to provide a protection mechanism used with a flexure for shorting the MR wired leads to disable the MR sensor and isolate it from electrostatic discharge.

It is a further object of this invention to provide a test clip for use with a temporary ESD protection mechanism for testing an MR head during manufacture.

SUMMARY OF THE INVENTION

According to the invention, ESD protection is providded to a magnetic head by selectively causing a shorting bar to short and thereby disable the magnetic head by folding over a portion of a flexure to which the magnetic head is electrically attached.

The invention has the advantage that the magnetic head can be activated or deactivated by simply inserting or removing a clip.

In accordance with an aspect of the invention, a novel test clip is provided for use with a folded flexure. The folded flexure is inserted into jaws of the test clip. The jaws clamp the folded flexure. The shorting bar shorts the magnetic head when the test clip is in a first position and removes the short when the test clip is moved to a second position.

DETAILED DESCRIPTION OF THE INVENTION

Figure 1:
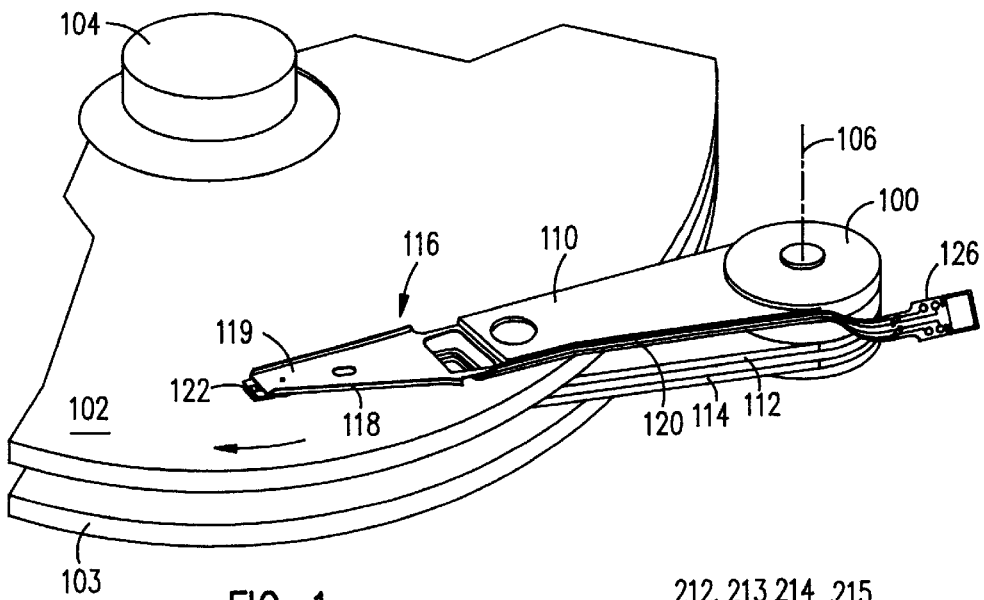
FIG. 1 is a fragmentary view of a disk drive having a magnetic head suspension which includes a flexure in which the present invention is embodied.

FIG. 1 shows a fragmentary view of a disk drive having an actuator arm assembly 100 and a stack of spaced apart disks 102, 103, rotatable about a common shaft 104. The actuator arm assembly 100 is rotatable about an actuator arm axis 106. The arm assembly 100 includes a plurality of actuator arms 110, 112, 114, which extend into spaces between the disks 102 and 103. Attached to each of the actuator arms 110, 112, 114, is a magnetic head suspension 116, which comprises a resilient load beam 118, a flexure 120 and a slider 122. The flexure 120 extends close to the middle of the load beam 118 and is flattened against, and secured to the load beam 118. A rearward section 126 of the flexure 120 extends for connection to the read/write electronics (not shown) of the disk drive by means of contact pads shown more clearly in FIG. 2.

Figure 2:
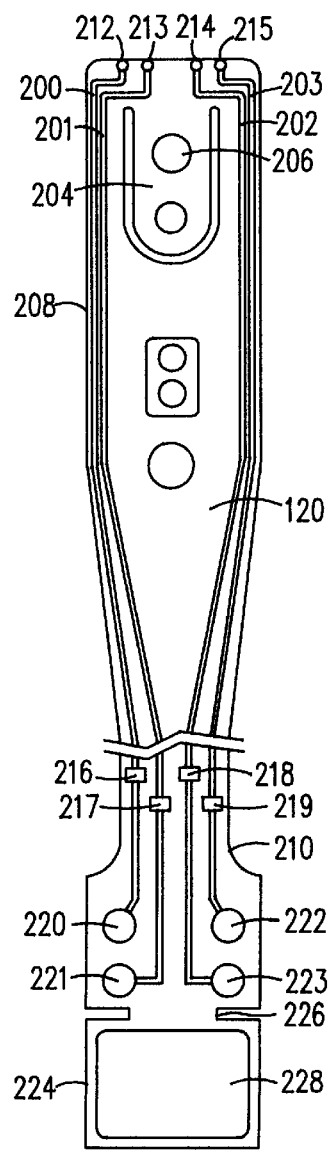
FIG. 2 is a plan view of the flexure shown in FIG. 1.

Referring to FIG. 2, the flexure 120 shown in FIG. 1 is formed of a flexible laminate comprised of a pattern of conductive traces 200–203 that are retained and electrically insulated by a compliant dielectric layer. The dielectric layer is a flat, flexible sheet of material bonded on one side to the patterned conductive traces 200–203. A tongue 204 has a dimple 206 for providing a pivot point for the slider 122, shown in FIG. 1. The dielectric layer is made of plastic or a polymeric resinous material, such as polyimide, and is bonded by means of a glue layer to the conductive traces. The method of manufacture of the flexure is described in more detail in the above-referenced copending application Ser. No. 08/600,240.

The conductive traces 200–203 may be made of metal, preferably from copper, due to copper's desirable conductivity and tensile modulus. The conductive traces 200–203 and the bottom surface of the flexure 120 are coated with an external layer in order to prevent the conductive traces from shorting.

The flexure 120 provides sufficient flexibility in various degrees of movement of the slider 122 for accommodating the uneven topology of the disk surface, while the slider 122 is flying over the disk 102, and yet sufficiently stiff to resist any physical deformation that may be caused by the rapid movements of the actuator arm assembly 100. For this purpose, the conductive traces 200–203 are patterned so as to impart optimal mechanical and structural support to the slider 122 and the load beam 118.

The flexure 120 has a distal or forward section 208, a bend section (not shown), and a proximal or rearward section 210. The forward section 208 extends generally symmetrically relative to the protrusion section 119 (see FIG. 1) of the load beam 118, and is attached thereto along most of its entire length, via welding or gluing. Such symmetry is desirable because it tends to provide desirable resonance frequency and static stiffness characteristics.

The conductive traces 200–203 terminate at the forward-most section of the flexure 120 in conductive contact pads 212–215, respectively, for connection to corresponding pads on the slider 122 by, for example, stitch bonding or ultrasonic welding. The rearward section 210 of the flexure 120 extends rearwardly for connection by four pads, 216, 217, 218, 219, to read/write electronics (not shown) of the disk drive. The flexure 120 is tested using four test pads 220, 221, 222, 223 at the end of the rearward section 210. Once the flexure 120 is successfully tested, the test pads 220–223 are usually sheared, for example along the broken dash lines of FIG. 2, and the connection pads 216–219 are connected to the read/write electronics during final assembly of the disk drive.

In accordance with the present invention an additional shunt section 224 of the flexure is fabricated. The shunt section is an extension of the rearward section 210 of the flexure and includes a hinge 226. A shorting bar or pad 228 is fabricated on the shunt section 224 and is made of a conducting material such as copper.

Figure 3A:
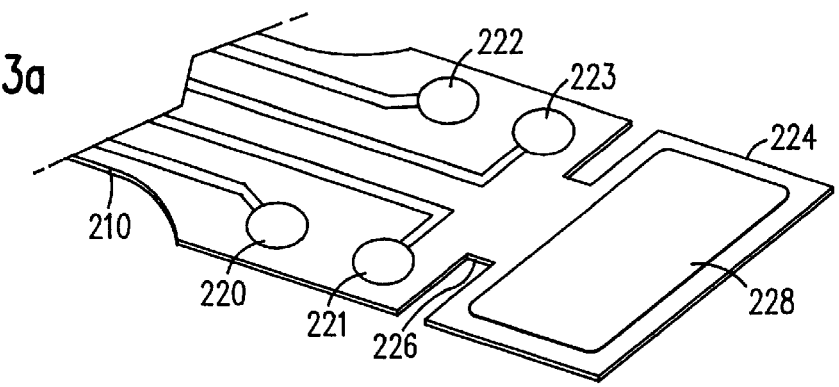
FIGS. 3a–3d are perspective views of the rear section of the flexure shown in FIG. 2 showing the conductive traces patterned according to an embodiment of the present invention.
Figure 3B:
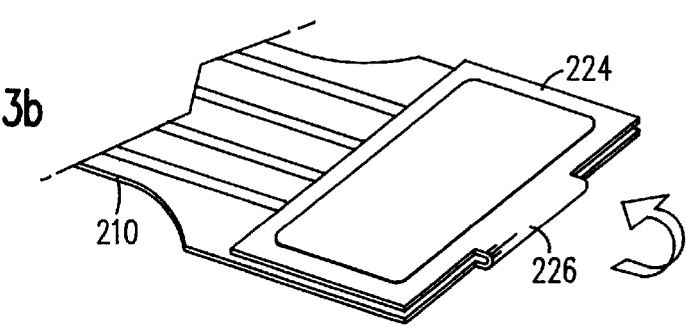
Figure 3C:
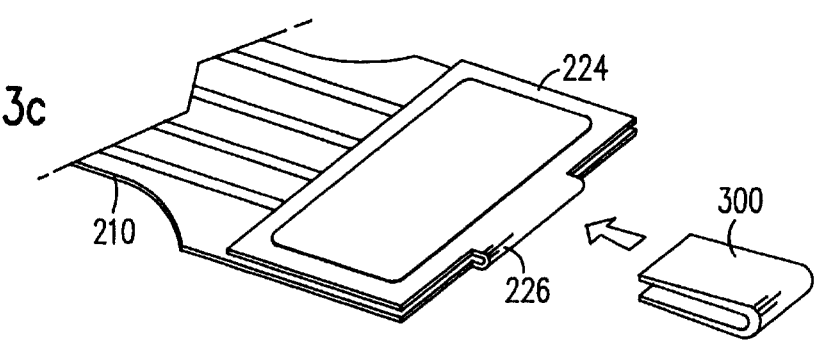

FIGS. 3a–3e are perspective views of the rear section 210 of the flexure 120 showing the conductive traces patterned according to an embodiment of the present invention. The dimensions of the shunt section 224 and the shorting pad 228 are such that, as shown in FIG. 3b, when the shunt section 224 is folded at the hinge 226, the shorting pad 228 overlays the test pads 220–223 thereby effecting an electrical short. The folded flexure material may be held in place by a clip 300.

Figure 3D:
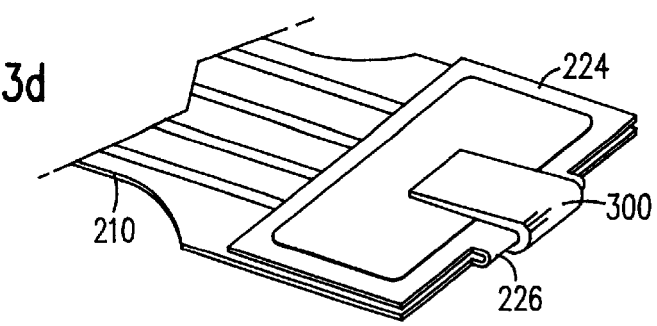
Figure 4:
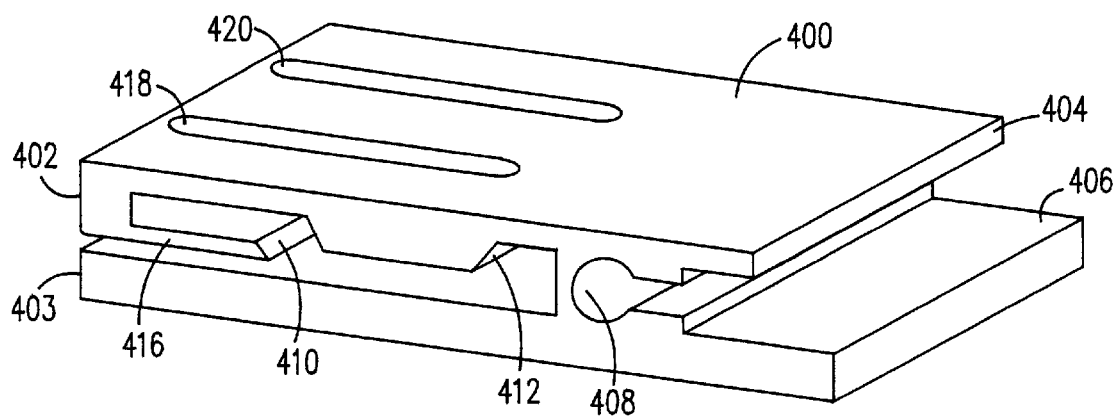
FIG. 4 is a perspective view of a test clip for use with the flexure shown in FIG. 2; and, FIGS. 5a and 5b are side views of the test clip shown in FIG. 4 attached to a flexure.
Figure 5A:
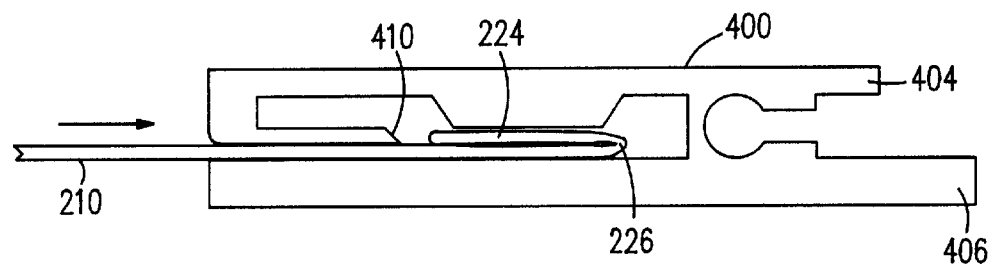

Refer to FIG. 4 which is a perspective view of a test clip 400 that may be used instead of the clip 300 shown in FIGS. 3d and 3e. The test clip includes an upper jaw 402 and lower jaw 403 at one end and handles 404, 406 at the other end that are pivotally joined at a fulcrum 408. The handles 404, 406 provide leverage about fulcrum 408 to open the jaws 402, 403. The jaws open wide enough that the folded flexure material can be inserted through the open jaws when inserted. Upon release of the handles, the jaws close and grip the inserted flexure. The test clip is provided with a knife edge 410 and a clamping block 412. The clamping block 412 clamps the folded flexure material against the lower jaw 403 to ensure tight contact of the shorting bar 228 with the pads 220–223, when the test clip is in the position illustrated in FIG. 5a.

Figure 5B:
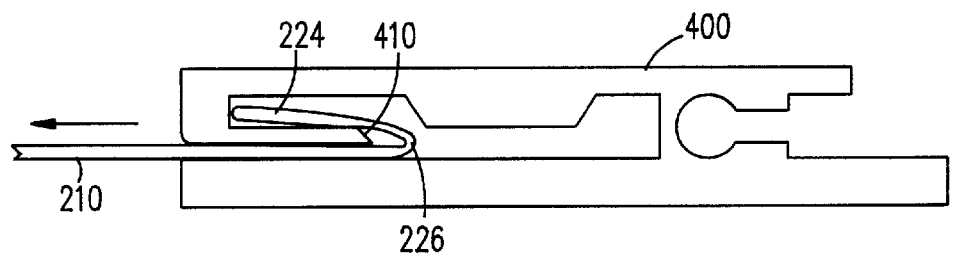

When the test clip is moved in the direction of the arrrow to the position illustrated in FIG. 5b, the knife edge 410 slips under the folded flexure material lifting the shorting bar out of contact with the pads 220–223, allowing the MR head to be made operable without completely removing the test clip. The shorting bar may be moved into contact with the pads by moving the test clip back to the position illustrated in FIG. 5a.

The test clip may be provided with multiple contacts that engage the pads 220–223 when the test clip is in the position illustrated in FIG. 5b. In this case, the under side 416 of the knife edge 410 is provided with lead-engaginq contacts (not shown) that directly engage the pads 220–223. The contacts may be connected by wire traces to suitable contacts 418, 420, on the upper surface of the test clip for access by a probe.

While the invention has been particularly shown and described with reference to preferred embodiments thereof, it will be understood by those skilled in the art that the foregoing and other changes in form and detail may be made therein without departing from the scope of the invention.

What is claimed is:

1. An apparatus for selectively disabling a magnetic head comprising:

means for electrically attaching said magnetic head to a flexure having a set of test pads and a hinged portion that includes a shorting bar; and, means for folding said hinged portion of said flexure resulting in a folded portion in which said shorting bar shorts said test pads.

2. The apparatus of claim 1 further comprising:

means for securing said folded portion of said flexure in a folded position.

3. The apparatus of claim 2, wherein said means for securing said folded portion of said flexure in a folded position is a test clip which comprises:

a fulcrum;

an upper jaw and lower jaw at one end of said test clip;

handles at an end of said test clip opposite said upper jaw and said lower jaw for providing leverage about said fulcrum to open said jaws;

said jaws and handles being pivotally joined at said fulcrum;

said jaws opening so that said folded portion fits into said open jaws;

said test clip being provided with a knife edge and a clamping block;

said clamping block clamping said folded portion against said lower jaw to ensure tight contact of said shorting bar with said test pads upon a condition that said jaws are closed;

said knife edge adapted to slipping under said folded portion and lifting said shorting bar out of contact with said test pads.

4. A flexure for selectively disabling a magnetic head comprising:

conductive contact pads for electrically attaching said magnetic head to said flexure;

a set of test pads; and a hinged portion of said flexure adjacent to said test pads;

said hinged portion including a shorting bar.

5. The flexure of claim 4 further comprising:

a test clip for securing said hinged portion of said flexure in a folded position in which said shorting bar shorts said test pads.

6. The flexure of claim 5, wherein said test clip comprises:

an upper jaw and lower jaw at one end of said test clip;

handles at an end of said test clip opposite said upper jaw and said lower jaw;

a fulcrum;

said jaws and handles being pivotally joined at said fulcrum;

said handles providing leverage about said fulcrum to open said jaws;

said jaws opening so that said folded flexure fits into said open jaws;

said test clip being provided with a knife edge adapted to slip under said folded flexure and lift said shorting bar out of contact with said test pads; and a clamping block for clamping said folded flexure against said lower jaw to ensure tight contact of said shorting bar with said test pads when said jaws are closed.

7. A magnetic head suspension assembly for transducing data from and onto a surface of a rotating magnetic disk comprising:

a load beam;

a flexure secured to said load beam, said flexure including a dielectric layer within which a pattern of conductive traces is formed, said flexure having a proximal end and a distal end;

an air bearing slider secured to said flexure at said distal end, said slider supporting a magnetic transducer, said load beam supplying a force to said slider to maintain said slider at a desired height above said surface of said magnetic disk;

said conductive traces being patterned for electrically connecting said transducer to read/write circuitry;

said conductive traces terminating in test pads at said proximal end;

a hinged portion of said flexure at said proximal end;

said hinged portion including a conductive bar for shorting said test pads when said hinged portion is folded to a folded position.

8. The apparatus of claim 7, further comprising a test clip for clamping said hinged portion in said folded position.

9. For use with a magnetic head suspension assembly for transducing data from and onto a surface of a rotating magnetic disk, a magnetic head suspension including a load beam for supplying a directed force to a slider, so as to maintain the slider at a desired height above said disk surface, a flexure comprising:

a flexible laminate;

said flexible laminate having a proximal end and a distal end;

a pattern of conductive traces formed on said flexible laminate;

said conductive traces including contact pads for electrically connecting said slider to said conductive traces;

said flexible laminate terminating in test pads at said proximal end, said test pads being connected to said conductive traces;

a hinged portion of said flexible laminate at said proximal end;

said hinged portion including a conductive bar for shorting said test pads when said hinged portion is folded to a folded position.

10. The apparatus of claim 8, further comprising a test clip for clamping said hinged portion in said folded position.

11. The apparatus of claim 7 further comprising an MR head integrated in said slider and having multiple components coupled to corresponding lead wires in said flexure.

12. An apparatus for protecting a magnetic head from electrostatic discharge comprising:

a flexure having a distal end and a proximal end, said proximal end being attached by a hinge to a hinged portion that includes a shorting bar; and multiple lead wires connected to said magnetic head along said flexure from the distal end to the proximal end, said wires being terminated at a number of test pads at the proximal end;

said shorting bar being attached to said hinged portion in a position such that the shorting bar electrically shorts said test pads when said hinged portion bends toward said test pads about said hinge.

13. The apparatus of claim 12 further comprising:

a test clip for securing said hinged portion of said flexure in a folded position in which said shorting bar shorts said test pads.

14. The apparatus of claim 13, wherein said test clip comprises:

an upper jaw and lower jaw at one end of said test clip;

handles at an end of said test clip opposite said upper jaw and said lower jaw;

a fulcrum;

said jaws and handles being pivotally joined at said fulcrum;

said handles providing leverage about said fulcrum to open said jaws;

said jaws opening so that said folded flexure fits into said open jaws;

said test clip being provided with a knife edge adapted to slip under said folded flexure and lift said shorting bar out of contact with said test pads; and a clamping block for clamping said folded flexure against said lower jaw to ensure tight contact of said shorting bar with said test pads when said jaws are closed.

15. A clip for clamping a hinged portion of a flexure in a folded position comprising:

an upper jaw and lower jaw at one end of said clip;

handles at an end of said clip opposite said upper jaw and said lower jaw;

a fulcrum;

said jaws and handles being pivotally joined at said fulcrum;

said handles providing leverage about said fulcrum to open said jaws so that the folded flexure fits into said open jaws;

said test clip being provided with a knife edge adapted to slip under said folded flexure; and a clamping block for clamping said folded flexure against said lower jaw when said jaws are closed.

16. A method of selectively disabling a magnetic head comprising the steps of:

A. electrically attaching said magnetic head to a flexure having a set of test pads and a hinged portion that includes a shorting bar; and B. folding over said hinged portion of said flexure for causing said shorting bar to short said test pads.

17. The method of claim 16 further comprising the step of:

C. securing said folded portion with a clip.

* * * * *